Aug. 9, 1955   J. W. WILLIAMSON   2,715,171
HIGH-FREQUENCY INDUCTOR ARRANGEMENT
Filed Oct. 7, 1953
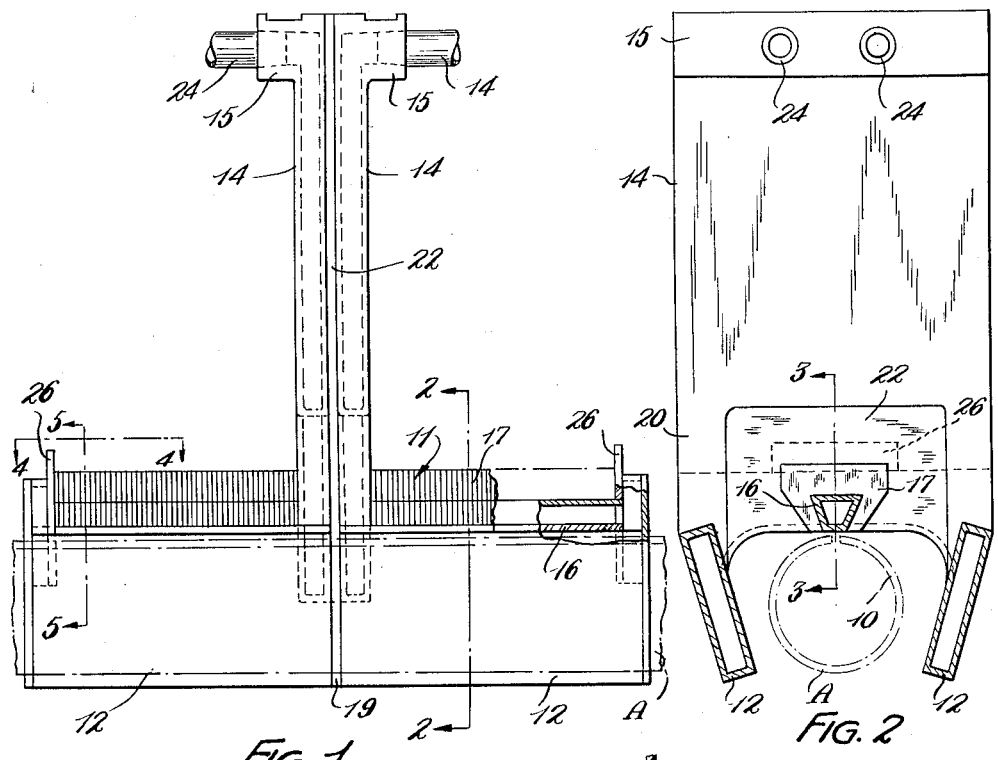
FIG. 1
FIG. 2
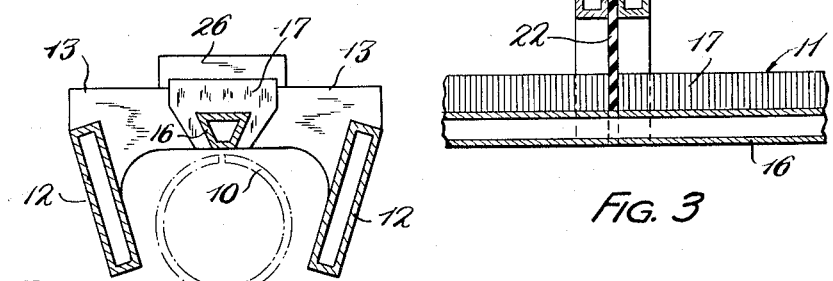
FIG. 3
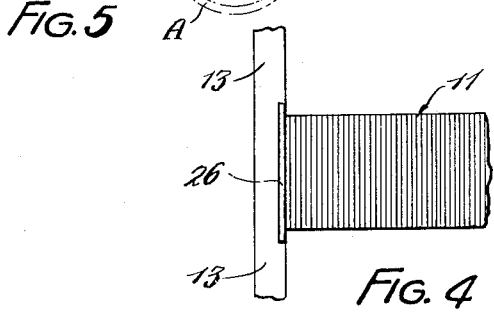
FIG. 5
FIG. 4
INVENTOR.
BY JAMES W. WILLIAMSON
Alfred C. Buck
ATTORNEY United States Patent Office 2,715,171
Patented Aug. 9, 1955

2,715,171

HIGH-FREQUENCY INDUCTOR ARRANGEMENT

James W. Williamson, Warrensville Heights, Ohio, assignor to The Ohio Crankshaft Company, Cleveland, Ohio, a corporation of Ohio Application October 7, 1953, Serial No. 384,546

2 Claims. (Cl. 219—10.79)

This invention pertains to the art of high-frequency induction heating and, more particularly, to a high-frequency inductor adapted to heat narrow portions or bands on elongated metallic members.

This application is a sole application describing and claiming subject matter originally described and claimed in a joint application of Alfred C. Body and James W. Williamson, Serial No. 146,888, filed February 28, 1950, now a sole application in the name of Alfred C. Body, now Patent No. 2,671,846 dated March 9, 1954.

The invention is particularly applicable to the field of heating the close-spaced opposite edges of a generally C-shaped metallic strip prior to welding the strip into pipe and will be so described hereinafter. Also, the strip will be referred to for the purposes of convenience as pipe, although it is appreciated that it is not pipe until the final welding of the edges has been completed.

The invention is, in some respects, an improvement on the high-frequency inductor shown and described in the copending application of Phillips N. Sorenson, Serial No. 86,066, now abandoned. In that application, there is shown a high-frequency inductor for heating the close-spaced edges of pipe to the welding temperature comprising generally: a main branch adapted to be disposed in close-spaced parallel relationship with the edges; a pair of side conductors parallel to the main branch and spaced therefrom and adapted to be in generally close-spaced relationship to the sides of the pipe spaced from the edges; and, end conductors connecting the side conductors in electrical parallel relationship and in series electrical relationship with the main branch. The main branch is divided at the center and the high-frequency power is fed into the inductor at this point by a pair of fish-tail leads. Also, the main branch had a stack of laminations along its entire length except where the fish-tail leads connected thereto.

Laminations, as used in inductors of this type, have a tendency to heat due to eddy currents in the laminations generated by the high-frequency flux fields surrounding the conductors. Normally, the maximum power which can be handled by any given inductor is limited by the maximum allowable temperature to which the laminations may be allowed to heat.

To limit this heating, each lamination is made as thin as possible and its flat surface is disposed perpendicular to the conductor so that the flux lines are always in the plane of the laminations. In the Sorensen application, it was noted that the end laminations of the stack; that is, the one adjacent to the end conductors, had a tendency to heat to a greater degree than the laminations elsewhere along the main conductor. It is believed that the cause of this uneven heating was due to the flux of the end conductors entering the laminations at an angle to the plane of the laminations themselves.

The present invention contemplates an inductor of the general type referred to wherein the end conductors adjacent the end laminations on the main branch have shielding means provided whereby the flux of the end conductors which enters the end laminations must enter in the plane of the laminations and not at an angle thereto.

It is an object of the invention to provide a high-frequency inductor which has uniform heating of the laminations throughout their entire length.

Still another object of the invention is the provision of shielding means adjacent the end laminations of the main branch for forcing the flux of the end conductors to enter the laminations at this point in the plane of the laminations and not otherwise.

The invention make take physical shape in a number of different forms, all of which may differ radically in appearance one from the other. In order to describe the invention, a preferred embodiment will be specifically described in this specification and illustrated in the accompanying drawings which are a part hereof, and wherein:

Figure 1 shows a side elevational view, with portions broken away for the purposes of clarity, of a high-frequency inductor embodying the present invention;

Figure 2 is a sectional view on the line 2—2 of Figure 1;

Figure 3 is a fragmentary sectional view on the line 3—3 of Figure 2;

Figure 4 is a fragmentary top elevational view of Figure 1 taken approximately on the line 4—4 of Figure 1; and Figure 5 is a fragmentary sectional view taken approximately on the line 5—5 of Figure 1.

Referring now to the drawings wherein the preferred embodiment is shown for the purposes of illustration only and not for the purpose of limitation, Figures 1 and 2 show a pipe A being moved progressively through a high-frequency inductor energized from a source of high-frequency energy not shown.

The pipe A forms no part of the present invention and is shown for the purposes of more clearly illustrating the invention.

In general, however, the pipe is generally C-shaped in cross section and has a pair of close-spaced edges 10 which are to be heated to a welding temperature and, subsequently, brought into pressure abutting relationship.

The inductor shown comprises a main branch indicated generally by the reference numeral 11, a pair of side conductors 12 and end conductors 13, a pair of fish-tail leads 14 and terminal blocks 15 which are adapted to be connected to matching terminal blocks on a transformer not shown.

The main branch 11 is the principal heat-inducing portion of the inductor and comprises generally an elongated straight conductor 16 having a generally trapezoidal cross-sectional shape with the narrower of the two parallel surfaces forming the pipe edge-adjacent surface thereof. This conductor is also hollow throughout its entire length so that the cooling water could be circulated therethrough.

The remaining three surfaces of the conductor 16 are closely surrounded by magnetically permeable material 17 of sufficient transverse thickness to carry the magnetic flux about the conductor 16 without saturating or overheating. The material 17 in the embodiment shown is comprised of a stack of thin flat laminations having their principal plane transverse to the length of the conductor 16. The laminations are electrically insulated one from the other by a thin film of insulation (not shown). The small dimension of the laminations measured in the direction of the current travel in the conductor 16 and the insulation between the individual laminations each contribute to a minimum of current flow and, thus, heating in the material.

It will be noted that the entire main branch extends parallel to and in close-spaced relationship to the edges 10. As the pipe A moves through the inductor, the flux of the conductor 16 enters the pipe A and generates high-frequency, high-concentrated electric currents to flow longitudinally in the edges 10 and rapidly heats these edges to a welding temperature.

The side conductors 12 are generally rectangular in cross-sectional shape, although they may be otherwise. They are also hollow to permit the flow of cooling water therethrough. As shown, the major dimension of the rectangular shape is somewhat greater than the diameter of the pipe to be heated and extends on a diverging angle from a horizontal plane slightly below the surface of the pipe A to a point slightly above the upper edge of the pipe A. As will be noticed, they are spaced a substantial distance from the sides of the pipe over their entire width. The lower edges of the side conductors 12 are, however, spaced a sufficient distance apart so that the entire inductor can be removed from the vicinity of the pipe A by movement transverse to the axis of the pipe.

As shown, the side conductors 12 are divided transversely at the center and spaced slightly as shown at 19. The fish-tail leads 14 are located primarily above the main conductor 11 and have a pair of spaced depending legs 20 extending downwardly on each side of and in spaced relationship to the main conductor 11 and connect to the side conductors 12 on each side of the split 19. A sheet of suitable insulation 22 is positioned between each fish-tail lead 14 and extends downwardly to also insulate the adjacent ends of the side legs 12 and fill the gap 19. As shown, the fish-tail leads substantially clear the outer periphery of the laminations 17 so that any flux field around the laminations will not and cannot link with any flux field which may be exterior to the fish-tail leads 14 and, particularly, in the space between the fish-tail leads 14 and the main branch 11.

In some instances, and with the construction shown, difficulty has been experienced due to the lack of sufficient rigidity in the inductor. The magnetic field about the main branch 11 tends to draw the pipe A and the main branch 11 toward each other with a considerable force. In order to provide rigidity to the entire inductor to withstand these magnetic forces, physical-support means are provided directly from the fish-tail leads to the main branch 11 to give the main branch support at least at some point along the length other than at the ends. Such means may take a number of different forms. In the embodiment shown, however, the insulating member 22 between the fish-tail leads 14 extends downwardly between and beyond the legs 20 and has an opening therein through which the conductor 16 extends and fits snugly. The laminations at this point are separated to permit the insulating plate 22 to fit around and engage the conductor 16. The plate 22 could be positioned over the laminations so as not to cause any interruption in the continuity thereof. With such an arrangement, the magnetic pull on the main branch 11 may be transmitted directly to the fish-tail leads over a minimum length of material and, thus, provide an inductor with a maximum of rigidity. It would be appreciated that, if necessary, gusset plates (not shown) could extend from the fish-tail leads outwardly in a plane parallel to the main branch 11 to provide additional support for its entire length. Other means of support could be provided.

The fish-tail leads 14 terminate at their upper end in terminal blocks 15 which are suitably shaped to end in terminal blocks on an impedance-matching transformer (not shown) connected to a suitable high-frequency power source. The transformer terminal blocks are not shown, but they constitute the means of support for the inductor shown.

The terminal blocks have fish-tail leads preferably hollow so that water or other cooling medium may be circulated through the interior of the inductor. Inlet ports 24 are shown for the purposes of providing access to circulate cooling medium through the interior passages of the inductor.

The end conductors 13 extend generally horizontally at each end of the inductor and transversely to the length of the conductors 11, 12. The ends of the conductors 13 are rigidly connected to the ends of the conductor 12 while the ends of conductor 11 are connected to the mid point of conductors 13. As shown, the vertical height of the end conductor is approximately the same as the vertical height of the end conductor 11 and the magnetic material 17 extends above the upper surface of the end conductor 13. Also, the portion of the material 17 on both sides of the conductor 11 faces the conductor 13.

The flux about the conductor 13 thus normally would tend to enter the laminations and generate currents in a major dimension of the laminations and will effect heating.

A flux shield is provided at the ends of the laminations adjacent the conductors 13 to force this flux to enter and leave the laminations in the plane thereof, thus not inducing any current flow in loops other than in a plane transverse to the plane of each lamination. As the laminations are very thin, the current in such a loop can, at best, be small and, thus, produce little heating.

The flux shield may take a number of different forms. Its principal requirement is that the entire end surface of the laminations abut against a flux-impervious material such as copper or other electrically-conductive material.

It might be pointed out here that while copper is completely transparent to a D. C. or unidirectional flux, it is quite opaque or impervious to a high-frequency alternating flux field, providing its thickness in inches is in excess of $3160\sqrt{p/f}$ where $p$ is the resistivity of the material of the shield in ohm inches and $f$ is the frequency in cycles per second.

In accordance with the invention, the preferred embodiment shows the end lamination of the stack of laminations formed of a copper sheet 26 which has external dimensions at least as great as the magnetic laminations; and, in the vertical dimension, exceeds the vertical height of the laminations and, thereby, extends above the laminations and tends to shield the laminations not only at the very end of the stack but the laminations near the end.

The shield could also be formed as part of the inductor itself such as by enlarging the vertical dimension of the end conductors 13 to be flush with or exceed the top surface of the lamination pack or a plate could be brazed onto the upper edge of the end conductor.

The shield is generally desirable wherever current is flowing in a conductor positioned angularly relative to the conductor on which the magnetic material is mounted and in close proximity to the material.

The inductor shown has proven extremely practical for the purpose of heating the edges of pipe prior to their being brought into pressure-welding engagement. The inductor and laminations operate cool.

The invention permits similar improvements in inductors intended for other purposes.

It can be appreciated that the inductor described above is only one embodiment of a large number which may result from the present invention. Other embodiments will occur to others upon a reading and understanding of this specification. It is my intention that all such modifications, insofar as they come within the scope of the appended claims, shall be included as part of the invention.

Having thus described my invention, I claim:

1. In a high-frequency inductor adapted to heat narrow, elongated portions on a metallic workpiece comprising first and second conductors angularly connected to each other, said first conductor being generally elongated and having a narrow elongated workpiece-facing surface, magnetically-permeable material positioned about the surfaces of said first conductor other than said workpiece-facing surface and along at least portions of its length, an end of said material being adjacent the point of connection of said conductors and flux-shielding means for said end, the improvement which comprises said second conductor having transverse dimensions at least as great as the transverse dimensions of said magnetic material and forming said flux-shielding means.

2. A high-frequency inductor adapted to heat narrow, elongated portions on a metallic workpiece comprising first and second conductors angularly connected to each other, said first conductor being generally elongated and having a narrow elongated workpiece-facing surface, magnetically-permeable material positioned about the surface of said first conductor other than said workpiece-facing surface and along at least portions of its length, an end of said material being adjacent the point of connection of said conductors and flux-shielding means for said end having transverse dimensions relative to said first conductor greater than the transverse dimension of said material relative to said first conductor so that said means will extend beyond said material.

References Cited in the file of this patent

UNITED STATES PATENTS

| | | |
|---|---|---|
| 2,632,092 | Cachat et al. | Mar. 17, 1953 |
| 2,632,840 | Sorenson | Mar. 24, 1953 |
| 2,671,846 | Body | Mar. 9, 1954 |